United States Patent
Neyman et al.

(10) Patent No.: US 6,464,746 B2
(45) Date of Patent: *Oct. 15, 2002

(54) HOMOGENEOUS GRANULES OF SLOW-RELEASE FERTILIZER AND METHOD OF MAKING THE SAME

(75) Inventors: Gary B. Neyman, Butler, PA (US); Elmer A. Derr, Richland, PA (US)

(73) Assignee: Lebanon Chemical Corporation, Lebanon, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,587

(22) Filed: Jul. 24, 1998

(65) Prior Publication Data

US 2002/0011087 A1 Jan. 31, 2002

(51) Int. Cl.⁷ .................................................. C05C 9/02
(52) U.S. Cl. .................... 71/28; 71/29; 71/30; 71/64.11
(58) Field of Search .................... 71/28, 64.11, 29, 71/30, 64.13, 27; 564/101

(56) References Cited

U.S. PATENT DOCUMENTS

| | | | | |
|---|---|---|---|---|
| 2,502,996 A | * | 4/1950 | Rohner | 71/30 |
| 2,618,546 A | | 11/1952 | Davenport | 71/30 |
| 3,322,528 A | | 5/1967 | Hamamoto et al. | 71/29 |
| 3,734,707 A | | 5/1973 | Seymour | 71/30 |
| 3,989,470 A | * | 11/1976 | Czurak et al. | 34/201 |
| 4,277,253 A | | 7/1981 | Walter et al. | 23/313 |
| 4,297,130 A | * | 10/1981 | Moore, Jr. | 71/28 |
| 4,378,238 A | | 3/1983 | Goertz | 71/3 |
| 5,039,328 A | * | 8/1991 | Saitoh et al. | 71/28 |
| 5,087,400 A | * | 2/1992 | Theuveny | 264/115 |
| 5,102,440 A | * | 4/1992 | Galant | 71/28 |
| 5,174,804 A | * | 12/1992 | Rehberg et al. | 71/3 |
| 5,238,480 A | | 8/1993 | Rehberg et al. | 71/28 |
| 5,266,097 A | * | 11/1993 | Moore | 71/28 |
| 5,317,834 A | * | 6/1994 | Anderson | 47/48.5 |
| 5,749,936 A | | 5/1998 | Humphries et al. | 71/64 |
| 5,849,060 A | * | 12/1998 | Diping | 71/64.07 |

FOREIGN PATENT DOCUMENTS

| | | | | |
|---|---|---|---|---|
| GB | 1479848 | * | 7/1977 | 71/28 |
| GB | 263035 | * | 3/1986 | 71/28 |
| JP | 57067091 | * | 4/1982 | 71/28 |
| JP | 8276294 | * | 5/1982 | 71/28 |

* cited by examiner

*Primary Examiner*—Wayne A. Langel
(74) *Attorney, Agent, or Firm*—Woodard, Emhardt, Naughton, Moriarty & McNett

(57) ABSTRACT

A process for making homogeneous granules of slow-release fertilizer to deliver high doses of slow-release nitrogen in pellets that disperse or fall apart when contacted by moisture. The method includes mixing particles of slow-release nitrogen with particles of a potassium source and particles of a phosphorus source, to make a homogeneous blend of the particles. Then, the blended particles are moistened with water or an aqueous solution of urea to moisten the homogeneous blend. After moistening, the blended particles are contacted with an aqueous suspension of urea-formaldehyde resin to bind the particles into homogeneous granules. The aqueous suspension of urea formaldehyde resin preferably has a urea:formaldehyde ratio of about 1:1.

10 Claims, No Drawings

HOMOGENEOUS GRANULES OF SLOW-RELEASE FERTILIZER AND METHOD OF MAKING THE SAME

FIELD OF THE INVENTION

The present invention relates generally to slow-release fertilizers, and more particularly to homogeneous granules of slow-release nitrogen and other fertilizer components. The invention also relates to a method of making the fertilizers.

BACKGROUND TO THE INVENTION

Among the qualities desired in commercial fertilizer products for the turf care industry are ease of application and longevity of activity. It is well known that slow-release fertilizer pellets provide both of those attributes, making slow-release granular fertilizers preferred by many turf care professionals.

Some of the most effective and desired slow-release fertilizer products are made from isobutylidene diurea ("IB"), and/or methylene ureas. For example, IsoTek$^{31®}$, offered by Lebanon Seaboard Corporation, is one IB-based product that has enjoyed much success. This is because IB is only slowly decomposed by water (by chemical hydrolysis), products made with IB provide a desirably gradual nitrogen availability accompanied by a lesser nitrogen loss and a reduced propensity to injure fertilized plants due to salt concentration effects.

Unfortunately however, several problems are associated with isobutylidene diurea and other slow-release fertilizers when provided in blended granular pellet form. For example, prior art granular IB-based fertilizers have heretofore been resistant to breakdown by moisture, so that granules applied to turf remains visible long after application, and are frequently picked up and lost with clippings during mowing. Further, in the standard ammoniation process it is difficult to produce a homogeneous product containing more than 20% nitrogen, even when compounded with additional nitrogen sources. Additionally, the standard process produces products having a nitrogen activity index of only about 35%, meaning 65% or more of the WIN is not available as plant nutrient in a timely fashion.

A need therefore exists for a fertilizer particle which will deliver high doses of slow-release nitrogen, and/or a combination of slow-release nitrogen technologies, in a pellet with improved dispersibility. The present invention addresses that need.

SUMMARY OF THE INVENTION

Briefly describing one aspect of the present invention, there is provided a process for making homogeneous granules of fertilizer. The preferred process combines three things: (1) a dry fertilizer mix that includes a source of slow-release nitrogen such as isobutylidene diurea and/or methylene ureas; (2) a urea-formaldehyde resin binder; and (3) a moisturizer such as water (steam or liquid), liquid urea, etc. The three items may be combined in any order.

One object of the present invention is to provide homogeneous granules of fertilizer to deliver high levels of efficient slow-release nitrogen in particles that readily disperse when contacted by moisture.

Further objects and advantages of the present invention will be apparent from the following description.

DESCRIPTION OF THE PREFERRED EMBODIMENT

For the purpose of promoting an understanding of the principles of the invention, reference will now be made to preferred embodiments and specific language will be used to describe the same. It will nevertheless be understood that no limitation of the scope of the invention is thereby intended, such alterations and further modifications in the preferred embodiments, and such further applications of the principles of the invention as described herein being contemplated as would normally occur to one skilled in the art to which the invention pertains.

As briefly described above, the present invention provides a process for making homogeneous granules of fertilizer to deliver high levels of slow-release nitrogen in particles that readily disperse when contacted by moisture. The preferred process combines a dry fertilizer mix, clay, a urea-formaldehyde resin binder, and a moisturizer. Most preferably, the dry fertilizer is first mixed with dry urea-formaldehyde resin, and the combined mixture is then granulated by mixing with dilute liquid urea. Water (provided as liquid or steam) may be added as necessary to complete the granulation. Drying and screening for size typically concludes the process.

Describing first the dry fertilizer mix, the inventive fertilizers described herein feature high levels of slow-release nitrogen in an easily dispersed formulation. Preferably, isobutylidene diurea ("IB") is used as one source of slow-release nitrogen because it is effective and familiar to the turf care industry. Even more preferably, IB is used in combination with another slow-release source of nitrogen such as Meth-Ex 40® methylene urea to provide slow-release nitrogen to the fertilizer. IB and a high activity index methylene urea such as Meth-Ex 40® are used in the most preferred embodiments.

In alternative embodiments other nitrogen-source materials are granulated according to the present invention. For example, in addition to IB and methylene urea, ammonium nitrate, ammonium sulfate ("AMS"), etc., may be used alone or in combination with IB and/or methylene urea.

In addition to the slow-release nitrogen, the dry fertilizer mix also preferably contains a source of phosphorus and a source of potassium. The source of potassium may be potash (KC1) or its sulfates, etc., all of which are available commercially. In the most preferred embodiments sulfate of potash ("SOP") and/or sulfate of potash-magnesia ("SPM") are used. The source of phosphorus may be monoammonium phosphate ("MAP"), diammonium phosphate ("DAP"), triple super phosphate ("TSP"), etc., all of which are generally available from commercial sources.

The amounts of nitrogen, phosphorus, and potassium included in the dry fertilizer mix may range from 0% to about 60% for each component. Most preferably, between about 0–60% slow-release nitrogen, 0–60% of a potassium source, and 0–60% of a phosphorus source are included in the dry fertilizer mix.

In addition to nitrogen, phosphorus, and potassium, the dry fertilizer also preferably includes other fertilizer components and/or nutrients such as iron, manganese, calcium, micronutrients, etc. The forms and source of these components are known to persons skilled in the art, and the appropriate amounts may be selected without undue experimentation.

Additionally, particles of clay, such as attapulgite or bentonite clay, are also preferably included in the blend. The clay facilitates granulation, and is preferably included at levels of about 25–150 pounds per ton. Most preferably, 25 to 75 lbs of attapulgite clay per ton of dry ingredients are used.

In the most preferred embodiments a dry fertilizer/clay mixture is prepared which contains 5–50% IB, 2–20%

Meth-Ex 40®, 5–50% potash, 5–50% monoammonium phosphate, 0.1–5% iron, 2–10% clay, and 2–20% urea.

Describing now the urea-formaldehyde resin used in the present invention, the preferred resin is a dry powder with a long storage life (at least 90 days) under normal storage conditions (dry, at temperatures between 15° C. and 30° C.). The resin preferably contains between about 10% and about 40% nitrogen, and most preferably contains about 30% N. Of the nitrogen contained in the resin, preferably less than about 10% is water insoluble nitrogen (WIN), and preferably less than about 1% is hot water insoluble nitrogen (HWIN). In the most preferred embodiments the resin contains less than 5% WIN, and less than about 0.1% HWIN.

It is also important that the urea-formaldehyde resin not be a resin that builds unacceptable levels of WIN or HWIN when used as a binder in nitrogen-containing fertilizers. The preferred urea-formaldehyde resin builds only modest amounts of WIN and HWIN, so that the WIN in the granulated product is less than about 7%, and the HWIN in the granulated product is less than about 2.8%. Most preferably, WIN levels of less than 5%, and HWIN levels of less than 2% are obtained in the granulated product. Resins such as GP 3865 resin from Georgia-Pacific Resins, Inc. are capable of providing that performance.

In the most preferred embodiments the resin has a urea:formaldehyde ratio of about 1:1, although other embodiments use a resin having a urea:formaldehyde ratio of between about 0.5:1 and about 15:1.

When an aqueous suspension of urea-formaldehyde resin is used, the amount of urea-formaldehyde resin in the aqueous suspension typically ranges from about 20% to about 80%. Preferably, about a 50% aqueous suspension of urea-formaldehyde resin is used. Further, the water used to prepare the aqueous suspension is preferably mildly alkaline to prevent the urea-formaldehyde resin from precipitating out of the suspension.

In one aspect of the present invention the urea-formaldehyde resin is added in dry form to the dry fertilizer/clay mixture. In other aspects of the invention the urea-formaldehyde is used as a mildly alkaline aqueous suspension. In all embodiments, the urea-formaldehyde is used in amounts and in a manner effective to bind the fertilizer components together. Most preferably, the amount of urea-formaldehyde resin used in the granulation process is between about 1% and 5%.

Describing now the moisturizer, in one preferred embodiment plain water is used to moisten the dry components for granulation. The water may be provided at ambient temperature, or it may be heated to provide additional energy for the granulation process. In one preferred embodiment the water is provided as steam.

In other preferred embodiments, aqueous solutions of fertilizer components are used to moisten the fertilizer. For example, an aqueous solution of urea is used as the moisturizer in the most preferred embodiment. When aqueous urea is used, it is preferably used at a concentration of about 1:100 to about 2.5:1 (urea:water). In one preferred embodiment a 2.3:1 solution of urea:water is used.

Describing now the granulation process, the basic process involves combining the four "components," i.e., the dry fertilizer mix, the clay, the urea-formaldehyde resin, and the moisturizer, and mixing to granulate the ingredients into homogeneous granules. As indicated above, the four components may be combined in any order. Ambient temperature and atmospheric pressure are typically used.

In one preferred embodiment the process begins by providing particles of the dry fertilizer mix that will be included in the homogeneous granules. Most preferably, the dry fertilizer components are provided as particles sized from fine powder up to about 85 SGN. As is known to the art, particles of appropriate size may be purchased from commercial sources, or they may be obtained by crushing or milling larger sized particles and screening for size.

After obtaining appropriately sized particles, the dry ingredients are preferably combined with dry urea-formaldehyde resin and are mixed until a well-mixed blend of those ingredients is obtained. Most preferably, the dry ingredients (fertilizer mix, clay, and urea-formaldehyde resin) are mixed by tumbling in a rotary mixer, although other methods of mixing may be used. For example, mixing in a paddle mixer or in a ribbon or other type of batch mixer may be preferred in certain embodiments.

After the initial dry mixing, the dry particles are moistened and further mixed to begin the granulation process. In one preferred embodiment, the blended particles are moistened by spraying them with steam to additionally heat the particles during moistening. In another embodiment, the blended particles are moistened with plain water, which may be sprayed or "misted" onto the blend. In a third preferred embodiment, a 70% urea solution is used as the moisturizer. Any of these moisturizers may be used alone, or in combination with others. Regardless of whether steam, water, or another moistener is used, the moistening and mixing preferably takes place in a tumbler or other mixer so that the particles are evenly moistened.

The amount of moisture added to the granules should be regulated; too little or too much moisture being detrimental to final granule integrity. Most preferably, granules that contain less than about 1% moisture when dry are contacted with steam until their moisture content increases to between about 5 and 10%.

As previously indicated, the components are mixed with moisture until homogeneous particles of fertilizer are obtained. As used in this application, "homogeneous" granules are granules that contain most, if not all, of the fertilizer components. In the most preferred embodiments, substantially all of the homogeneous granules will include a source of slow-release nitrogen, a source of phosphorus, and a source of potassium. It is to be appreciated that some granules may not include a perfect ratio of all components, but the majority of the granules will include each ingredient. Of course, if it is desired to produce a homogeneous granule having, for example, a 20:0:20 NPK ratio, no phosphorus would be included in the homogeneous granules. Similarly, if it is desired to produce a homogeneous granule having, for example, a 25:15:0 NPK ratio, no potassium would be included in the homogeneous granules.

In another embodiment the moistening and binding with urea-formaldehyde resin steps are substantially combined. In that embodiment, the dry ingredients are moistened with dilute urea-formaldehyde resin binder, preferably before a more concentrated urea-formaldehyde binder is used. As with the previously described embodiments, the moistener and binder are added at more than one location in a tumbler, so a variety of concentrations of urea-formaldehyde resin may be used. For example, a 10% suspension of urea-formaldehyde resin may be added at the initial liquid addition location, followed by 30% and 50% urea-formaldehyde resin suspensions further down the tumbler flow path.

In a further preferred embodiment, the urea:formaldehyde resin is added after moistening. In this method a homogeneous granular product is obtained by contacting the blend with a mildly alkaline aqueous suspension of urea-formaldehyde resin to bind the fertilizer components together. In the preferred embodiments, an aqueous suspension of urea-formaldehyde resin is injected into a tumbler with the moistened blend so that the particles are substantially evenly coated with the suspension. The urea-formaldehyde resin addition is preferably accomplished by spraying the aqueous suspension into the tumbler at several locations.

After granulation, the granules are fed to a dryer. In the preferred embodiments, a rotating dryer with a drying zone temperature of between about 185° F. and about 200° F. is used. The temperature of the product leaving the dryer is preferably about 185° F.

After drying, the material is cooled to room temperature, most preferably in an ambient temperature tumble cooler. After cooling, the product is passed to a screening apparatus to separate granules meeting the desired size specifications. Oversize granules and fines are recycled, with oversize granules being milled or crushed and fed back into the tumbler, and the fines being fed directly back into the tumbler. Appropriately sized granules are taken as product.

It is to be appreciated that the described process readily allows for the production of homogeneous fertilizer granules having more than 20% N. In the standard ammoniation processes of the prior art, nitrogen concentrations in excess of 20% are difficult, if not impossible, to obtain.

It is also to be appreciated that the inventive process allows for the production of fertilizer granules having an abrasion index of between 4% and 5%, a dispersion index in excess of 60%, and an activity index in excess of 50%. Most preferably, granules having an activity index in excess of 60% and a dispersion index in excess of 80% are obtained.

To determine the abrasion index of the granulated product the following procedure is followed:

1. A 100 gram test sample of granular product was prescreened to a lower limit of 20 Tyler mesh for −8 +20 mesh granules.
2. Stainless steel balls (about 15 balls, each having a diameter of about three-quarters of an inch, with a total weight of about 420 grams) were added to the screen with the test sample.
3. The screen with the granular test sample and the stainless steel balls was introduced into a lidded constantly vibrating sieve shaker having a collection pan positioned beneath the screen.
4. The shaker assembly was operated for twenty minutes, and thereafter the balls were removed from the screen and the final product was weighed.
5. The abrasion index was calculated by determining the ratio of the final weight of the crushed product to its initial weight.

To determine the dispersion index of the granulated product the following procedure is followed:

1. A 10 gram test sample of granular product is screened to a −12 +16 size to remove any effects of differing particle size.
2. The granules are placed in beaker containing 100 ml distilled water and stirred with a magnetic stirrer for about three minutes.
3. The contents of the beaker are poured onto a 25 mesh sieve, with a 100 ml rinse being used to assure that all −25 material is removed. The fertilizer on the sieve is then rinsed for about 15 seconds with a low pressure water stream.
4. The contents of the sieve are transferred to a preweighed sheet of brown paper and dried (50–70° C.).
5. After cooling, the dispersion index is calculated by weighing the paper plus fertilizer and comparing to the original weight. The dispersibility index is the percent of fertilizer that is gone.

The activity index is calculated by dividing the hot water soluble nitrogen (i.e., the WIN that is not HWIN) by the total amount of WIN. Thus, a WIN of 5% and a HWIN of 2% yields an activity index of 60%.

Reference will now be made to specific examples using the processes described above. It is to be understood that the examples are provided to more completely describe preferred embodiments, and that no limitation to the scope of the invention is intended thereby.

EXAMPLE 1

In a bench scale test, a five-pound batch of a 24-4-12 fertilizer with 50% of the nitrogen coming from isobutylidene diurea was prepared.

| Isobutylidene diurea | 884 g (*.31 = 274 g N / 2218 g total = 12.36% N from IB) |
|---|---|
| Sulfate of potash | 536 g (*.51 = 273.4 g $K_2$ / 2218 g = 12.32% $K_2O$) |
| Monoamm. phos. | 182 g (*.1 = 18.2 g N / 2218 g total = 0.8% ammoniacal N) |
| | (*.5 = 91 g $P_2O_5$ / 2218 g total = 4.1% $P_2O_5$) |
| Urea | 559 g (*.46 = 257.1 g N / 2218 g total = 11.59% Urea WSN) |
| Clay | 57 g (equivalent to 50 lb/ton) |

All materials were crushed and screened to pass through a 1.0 mm screen. Then, 80% of the mixed, dry powder was placed in a tumble mixer. With the mixer operating, steam was sprayed on the rolling powder until it was apparent (by color change) that the powder was moist. After moistening, an aqueous suspension of urea-formaldehyde (1:1 in urea:formaldehyde) was sprayed into the tumbler at two locations. Further tumbling of the mixture produced fertilizer granules which are substantially homogeneous with respect to the distribution of nitrogen, phosphorus and potassium.

After the initial granulation, the mixture was heated with an electric heat gun and was alternately treated with an aqueous urea:formaldehyde spray and the remaining dry material while attempting to maintain the moderate degree of moisture using color as the indicator. When all dry material had been added, heat was applied to dry the mixture until granulation was nearly complete.

The mixture was dried overnight at 140° F. A crush test on individual particles showed that approximately 2 kg of pressure was required to break each particle. A total of 1,752 g, or 79% of the starting material, was collected and screened. Granules of the appropriate size in good yield were obtained.

EXAMPLE 2

A production batch of 14—14—14 fertilizer was prepared according to the following formula (weights of components given per ton): 220 lbs. Meth-Ex 40®, 310 lbs. isobutylidene diurea, 560 lbs. monoammonium phosphate, 559 lbs. SOP, 52 lbs. SPM, 45 lbs. magnesium oxide, 11 lbs. manganese sulfate, 25 lbs. ammonium sulfate, 11 lbs. manganese oxide, 67 lbs. iron frit, 50 lbs. attaclay, 25 lbs. GP 3865 urea-formaldehyde resin, and 90 lbs. 70% urea solution. The resin had been premixed with the SPM, and the MgO, $MnSO_4$, MnO, Fe, and attaclay had been premixed as well.

Granulation took place readily as the run began. Steam was added to maintain a temperature of 155–180° F., and water was added to produce the proper consistency.

EXAMPLE 3

A batch of 8-4-24 fertilizer was prepared according to the following formula: 220 lbs./ton Meth-Ex 40®, 100 lbs./ton AMS, 160 lbs./ton monoammonium phosphate, 905 lbs./ton SOP, 50 lbs./ton SPM, 30 lbs./ton magnesium oxide, 12 lbs./ton manganese oxide, 12 lbs./ton manganese sulfate, 35 lbs./ton iron frit, 100 lbs./ton attaclay, and 25 lbs./ton GP 3865 urea-formaldehyde resin.

The product obtained comprised homogeneous granules with an abrasion index of 9% and a dispersion index of 95%.

EXAMPLE 4

A batch of 10–18-18 fertilizer was prepared according to the following formula (weights of components given per ton): 75 lbs. Meth-Ex 40®, 115 lbs. isobutylidene diurea, 720 lbs. monoammonium phosphate, 675 lbs. SOP, 50 lbs. SPM, 30 lbs. magnesium oxide, 12 lbs. manganese oxide, 12 lbs. manganese sulfate, 35 lbs. iron frit, 100 lbs. attaclay, and 25 lbs. urea-formaldehyde resin.

The product obtained comprised homogeneous granules with an abrasion index of 10% and a dispersion index of 99%.

EXAMPLE 5

A batch of 20-0-12 fertilizer was prepared according to the following formula (weights of components given per OR ton): 260 lbs. Meth-Ex 40®, 650 lbs. isobutylidene diurea (Ground, −20 mesh), 445 lbs. SOP, 50 lbs. SPM, 30 lbs. magnesium oxide, 12 lbs. manganese oxide, 12 lbs. manganese sulfate, 35 lbs. iron frit, 100 lbs. attaclay, 50 lbs. GP 3865 urea-formaldehyde resin, and 165 lbs. ground limestone filler.

The product obtained comprised homogeneous granules with an abrasion index of 9.5% and a dispersion index of 95%.

EXAMPLE 6

A batch of 21-4-12 fertilizer was prepared according to the following formula (weights of components given per ton): 220 lbs. Meth-Ex 40®; 610 lbs. IB; 256 lbs. ammonium sulfate; 160 lbs. monoammonium phosphate; 500 lbs. SOP; 35 lbs. iron frit; 50 lbs. attaclay; 25 lbs. GP 3865 urea-formaldehyde resin; and 200 lbs. 70% urea solution.

The product obtained comprised homogeneous granules with WIN of 3.6%, HWIN of 0.9%, and an activity index of 74%.

EXAMPLE 7

A batch of 18-2-18 fertilizer was prepared according to the following formula (weights of components given per ton): 200 lbs. Meth-Ex 40®; 350 lbs. IB; 70 lbs. dry urea; 347 lbs. ammonium sulfate; 80 lbs. monoammonium phosphate; 735 lbs. SOP; 35 lbs. iron frit; 50 lbs. attaclay; 25 lbs. GP 3865 urea-formaldehyde resin; and 150 lbs. 70% urea solution.

The product obtained comprised homogeneous granules with WIN of 2.0%, HWIN of 0.9%, and an activity index of 60%.

While the invention has been illustrated and described in detail in the drawing and foregoing description, the same is to be considered as illustrative and not restrictive in character, it being understood that only the preferred embodiment has been shown and described and that all changes and modifications that come within the spirit of the invention are desired to be protected.

We claim:

1. A process for making homogeneous granules of isobutylidene diurea and other fertilizer components; said process comprising:
    (a) mixing particles of isobutylidene diurea, particles of a potassium source material, particles of a phosphorus source material, particles of clay, and particles of a powdered urea-formaldehyde resin together to form a mixture; and
    (b) contacting said mixture with an aqueous moisturizer while mixing in the absence of methyl-urea to form granules of slow-release fertilizer.

2. The process of claim 1, and further including the steps of drying the granules and cooling the granules after drying.

3. The process of claim 2, and further including the step of screening the granules for size after cooling.

4. The method of claim 3, and further including the step of recycling the oversized and undersized granules obtained during said screening step.

5. The process of claim 1 wherein said mixing step additionally comprises mixing particles of methylene urea with the components of claim 1.

6. The process of claim 1 wherein said urea-formaldehyde resin has a urea:formaldehyde ratio of about 1:1.

7. The process of claim 1 wherein said mixture includes about 50 to 1000 lbs./ton of isobutylidene diurea, about 50 to 1000 lbs./ton of the potassium source material, about 50 to 1000 lbs./ton of the phosphorus source material, about 50 to 200 lbs./ton of the clay, and about 25 to 75 lbs./ton of the urea-formaldehyde resin.

8. The process of claim 5 wherein said mixture includes about 50 to 1000 lbs./ton of isobutylidene diurea, about 25 to 250 lbs./ton of methylene urea, about 50 to 1000 lbs./ton of the potassium source material, about 50 to 1000 lbs./ton of the phosphorus source material, about 50 to 200 lbs./ton of the clay, a moisturizer, and about 25 to 75 lbs./ton of the urea-formaldehyde resin.

9. A process for making homogeneous granules of isobutylidene diurea and other fertilizer components; said process comprising:
    (a) mixing particles of isobutylidene diurea, particles of clay, and particles of a powdered urea-formaldehyde resin together to form a mixture; and
    (b) contacting said mixture with an aqueous moisturizer while mixing in the absence of methyl-urea to form granules of slow-release fertilizer.

10. A process for making homogeneous granules of isobutylidene diurea and other fertilizer components; said process comprising:
    (a) combining dry particles of isobutylidene diurea, dry particles of a potassium source material, dry particles of a phosphorus source material, and dry particles of clay with a dry urea-formaldehyde resin to form a dry mixture of those components;
    (b) wetting said dry mixture with an aqueous moisturizer in an amount sufficient to increase the moisture content of the mixture to between 5% and 10%; and
    (b) mixing the moistened mixture in the absence of methylol-urea; wherein said mixing is performed for a time sufficient to granulate the particles together into homogeneous granules.

* * * * *

UNITED STATES PATENT AND TRADEMARK OFFICE
CERTIFICATE OF CORRECTION

| | | |
|---|---|---|
| PATENT NO. | : 6,464,746 B2 | Page 1 of 1 |
| APPLICATION NO. | : 09/122587 | |
| DATED | : October 15, 2002 | |
| INVENTOR(S) | : Gary B. Neyman and Elmer A. Derr | |

It is certified that error appears in the above-identified patent and that said Letters Patent is hereby corrected as shown below:

Claim 1, line 15, change "methyl-urea" to --methylol-urea--

Claim 9, line 48, change "methyl-urea" to --methylol-urea--

Signed and Sealed this

Fourth Day of December, 2012

David J. Kappos
*Director of the United States Patent and Trademark Office*

UNITED STATES PATENT AND TRADEMARK OFFICE
CERTIFICATE OF CORRECTION

Page 1 of 1

PATENT NO. : 6,464,746 B2
APPLICATION NO. : 09/122587
DATED : October 15, 2002
INVENTOR(S) : Gary B. Neyman and Elmer A. Derr It is certified that error appears in the above-identified patent and that said Letters Patent is hereby corrected as shown below:

Claim 1, column 8, line 15, change "methyl-urea" to --methylol-urea--

Claim 9, column 8, line 48, change "methyl-urea" to --methylol-urea--

This certificate supersedes the Certificate of Correction issued December 4, 2012.

Signed and Sealed this
Twenty-ninth Day of January, 2013

David J. Kappos
*Director of the United States Patent and Trademark Office*